United States Patent
Wang et al.

(10) Patent No.: US 9,741,317 B2
(45) Date of Patent: Aug. 22, 2017

(54) TOUCH ELECTRONIC DEVICE WITH TOUCH PANEL, WIRELESS TRANSMISSION MODULE, AND TOUCH LINK MODULE AND RELATED TOUCH LINK METHOD

(71) Applicant: MediaTek Singapore Pte. Ltd., Singapore (SG)

(72) Inventors: Yuanyuan Wang, Beijing (CN); Tzu-Wen Chang, Taipei (TW); Heyan Cao, Tianjin (CN)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 74 days.

(21) Appl. No.: 14/672,491

(22) Filed: Mar. 30, 2015

(65) Prior Publication Data
US 2015/0302826 A1 Oct. 22, 2015

(30) Foreign Application Priority Data
May 18, 2014 (CN) .......................... 2014 1 0158739

(51) Int. Cl.
| *G09G 5/12* | (2006.01) |
|---|---|
| *G06F 3/14* | (2006.01) |
| *G06F 3/041* | (2006.01) |
| *H04B 5/00* | (2006.01) |

(52) U.S. Cl.
CPC ............ *G09G 5/12* (2013.01); *G06F 3/0416* (2013.01); *G06F 3/1423* (2013.01); *H04B 5/0012* (2013.01); *G09G 2370/16* (2013.01); *G09G 2370/22* (2013.01)

(58) Field of Classification Search
CPC . G06F 3/0416; G06F 3/1423; G09G 2370/16; G09G 2370/22; G09G 5/12; H04B 5/0012
See application file for complete search history.

(56) References Cited

U.S. PATENT DOCUMENTS

| 6,967,576 B2* | 11/2005 | Hayes | G08B 13/1427 340/539.15 |
|---|---|---|---|
| 7,502,619 B1* | 3/2009 | Katz | G01S 5/02 340/531 |
| 7,898,414 B2* | 3/2011 | Spano | G08B 21/24 340/539.13 |

(Continued)

*Primary Examiner* — Shaheda Abdin
(74) *Attorney, Agent, or Firm* — McClure, Qualey & Rodack, LLP

(57) ABSTRACT

A touch electronic device includes a touch panel, a wireless transmission module and a touch link module. The wireless transmission module is utilized to receive data request information transmitted by a first external electronic device. The data request information relates to a data transmission function. The touch link module is utilized to develop a touch link between the touch electronic device and a second external electronic device through the touch panel when the wireless transmission module receives the data request information, and receive identification information transmitted by the second external electronic device through the touch link. The wireless transmission module transmits the identification information to the first external electronic device to execute identification of the touch electronic device, and the second external electronic device is different from the first external electronic device.

20 Claims, 8 Drawing Sheets

(56) References Cited

U.S. PATENT DOCUMENTS

| | | | |
|---|---|---|---|
| 8,738,925 B1* | 5/2014 | Park | H04B 7/26 380/270 |
| 2004/0174264 A1* | 9/2004 | Reisman | G07C 1/10 340/573.4 |
| 2004/0203859 A1* | 10/2004 | Yuen | G08B 1/08 455/456.1 |
| 2004/0217859 A1* | 11/2004 | Pucci | G08B 13/1427 340/539.32 |
| 2005/0212749 A1* | 9/2005 | Marvit | G06F 1/1613 345/156 |
| 2005/0285739 A1* | 12/2005 | Velhal | G08B 21/0227 340/572.1 |
| 2006/0158310 A1* | 7/2006 | Klatsmanyi | G08B 13/2462 340/10.1 |
| 2007/0008129 A1* | 1/2007 | Soliman | G01S 1/68 340/572.1 |
| 2007/0184852 A1* | 8/2007 | Johnson | H04W 64/00 455/456.1 |
| 2008/0042844 A1* | 2/2008 | Christopher | A62B 99/00 340/572.4 |
| 2008/0062120 A1* | 3/2008 | Wheeler | G08B 25/016 345/156 |
| 2008/0084334 A1* | 4/2008 | Ballew | G06Q 10/06 340/990 |
| 2009/0273560 A1* | 11/2009 | Kalanithi | G06F 3/002 345/156 |
| 2010/0164715 A1* | 7/2010 | Buller | G08B 13/1427 340/539.32 |
| 2010/0165965 A1* | 7/2010 | Carlton | H04W 4/02 370/338 |
| 2011/0012775 A1* | 1/2011 | Richards | H01Q 1/38 342/146 |
| 2013/0226444 A1* | 8/2013 | Johansson | G06F 3/0488 701/300 |
| 2013/0297690 A1* | 11/2013 | Lucero | G06Q 50/01 709/204 |
| 2013/0314302 A1* | 11/2013 | Jeung | G06F 3/1454 345/2.3 |
| 2014/0026068 A1* | 1/2014 | Park | G06F 3/0482 715/748 |
| 2014/0035761 A1* | 2/2014 | Burton | G01D 4/002 340/870.02 |
| 2014/0039804 A1* | 2/2014 | Park | A61B 5/0002 702/19 |
| 2014/0088922 A1* | 3/2014 | Messenger | A61B 5/0022 702/189 |
| 2014/0135042 A1* | 5/2014 | Buchheim | G01S 1/68 455/456.6 |
| 2014/0370917 A1* | 12/2014 | Buchheim | H04W 4/026 455/456.1 |
| 2015/0112264 A1* | 4/2015 | Kamen | A61M 5/14244 604/151 |
| 2015/0332573 A1* | 11/2015 | Selmanovic | H04L 67/1095 455/457 |

* cited by examiner

TOUCH ELECTRONIC DEVICE WITH TOUCH PANEL, WIRELESS TRANSMISSION MODULE, AND TOUCH LINK MODULE AND RELATED TOUCH LINK METHOD

CROSS REFERENCE TO RELATED APPLICATIONS

This application claims priority of China Patent Application No. 201410158739.5, filed on Apr. 18, 2014, the entirety of which is incorporated by reference herein.

BACKGROUND OF THE INVENTION

Field of the Invention

The present invention relates to an electronic device, and especially to a touch electronic device and a touch link method using the same.

Description of the Related Art

Near Field Communication (NFC) is a contactless technology for identification and interconnection. Near Field Communication allows users to intuitively exchange information, access content and services by using near field magnetic communication (such as near field magnetic communication of 13.56 MHz) between mobile devices, consumer electronics, PCs or smart electronic devices.

Due to the maturity of the market, a mobile phone with NFC can either support the function of the mobile payment or serve as a point of sale (POS) apparatus. However, a proximity card reader or like element must be added to the handheld device because NFC operates by sending and receiving signals based on magnetic fields, and that will make the size of the handheld device larger, and the layout and the elements of the handheld device might be limited.

Touch-link technology of a touch panel device which uses the existing panel and driver IC for communication has been developed recently, and has been described in U.S. 2011/0304583, U.S. 2013/0147760, CN 102916729A. The touch panel device includes a touch sensor. At least a part of the touch sensor includes at least a part of the touch panel of the touch panel device. The touch panel can be a touch panel without a display function, such as a touch pad, or with a display function, such as a touch screen. The touch sensor includes the driving electrodes and the sensing electrodes set on the board for forming a capacitance structure. At least one of the driving electrodes and the sensing electrodes is used as the sending electrode, and at least one is used as the receiving electrode. Thus, the signal can be sent and received by the existing electrodes and driver IC of the touch panel device for achieving the touch connection based on the electric field without an additional proximity card reader or like element, reducing the size and cost of the touch panel device.

FIG. 1 is a schematic diagram of a touch connection between a first touch panel device and a second touch panel device in accordance with the prior art. As shown in FIG. 1, there are near fields 103a and 103b between the first touch panel device 101 and the second touch panel device 102. It should be noted that the first touch panel device 101 and the second touch panel device 102 are enabled to send and receive a signal. The first touch panel device 101 sends the signal to the second touch panel device 102 through a communication media which has an electric field pointed to the second touch panel device 102 (the near field 103a as shown in FIG. 1). The second touch panel device 102 sends the signal to the first touch panel device 101 through a communication media which has an electric field pointed to the first touch panel device 101 (the near field 103b as shown in FIG. 1). The X channel and the Y channel shown in FIG. 1 are used as the sending electrodes and the receiving electrodes set on the board for forming the capacitance structure.

FIG. 2 is a logic chart for achieving the touch connection system between the first touch panel device and the second touch panel device in accordance with the prior art. The first touch panel device includes a signal sending system 201 shown in FIG. 2, and the second touch panel device includes a signal receiving system 202 shown in FIG. 2. The signal sending system 201 includes a touch-and-connect request signal generation unit 211, a communication connection establishing unit 212 and a first communication unit 213. The touch-and-connect request signal generation unit 211 is used to generate a request signal for sending touch connection to the second touch panel device 102 through the sending electrode. The communication connection establishing unit 212 establishes a communication connection with the second touch panel device 102 after the receiving electrodes receive a response signal from the second touch panel device 102. The first communication unit 213 sends the communication information or the data to the second touch panel device 102 through the sending electrodes of the touch panel (not shown) after the communication connection is established.

The signal receiving system 202 includes a touch-and-connect request response unit 221, a communication connection establishing unit 222 and a second communication unit 223. The touch-and-connect request response unit 221 responds with an acknowledge signal to the first touch panel device 101 through the sending electrodes after the receiving electrodes receive a touch-and-connect request signal sent from the first touch panel device 101. The communication connection establishing unit 222 establishes the communication connection with the first touch panel device 101 after the touch-and-connect request response unit 221 responds with an acknowledge signal to the first touch panel device 101. The second communication unit 223 receives the communication information or the data sent from the first touch panel device 101 through the receiving electrodes after the communication connection is established.

FIG. 3 is a schematic illustrating the transmission and receiving of the signal by the electrodes of the touch panel with the prior art. As shown in FIG. 3, the touch sensor (not shown) includes the sending electrodes 311, 321 and the receiving electrodes 312, 322 disposed on the board (such as the first touch panel 301 or the second touch panel 302) for forming the capacitance structure. The sending electrodes 311, 321 are used to send the signal, and the receiving electrodes 312, 322 are used to receive the signal.

FIG. 4 is a flow chart of the touch connection method in accordance with the prior art. First, in step S401, the touch-and-connect request signal generation unit 211 generates a touch-and-connect request signal, and sends it to the second touch panel device 102 through the sending electrodes. Then the receiving electrodes receive the acknowledge signal responded from the second touch panel device 102 (step S202). After that, the communication connection establishing unit 212 establishes the communication connection with the second touch panel device 102 (step S203). Finally, the method goes to step S404, and the first communication unit 213 sends the communication information or the data to the second touch panel device 102 through the sending electrodes.

Regarding the transmission of information, the users transmit or receive data by wire or wirelessly in their daily lives. However, for a transmission technology using wires, the matching process is initiated by a direct coupling of the connecting mechanism between electronic devices. For a wireless transmission technology, the matching of the devices is executed by the complicated authority setting of the communication protocols which is set by users or automatically initiated. The above wire or wireless transmission technology limits the users and results in poor user experience due to the complicated settings.

Compared to ordinary keyboards or mouse devices, the touch operation can provide a more convenient and user-friendly operation method to users. Accordingly, more and more electronic devices are equipped with a touch function. Regarding mobile payment, if users want to perform a data transmission function such as mobile payment though electronic devices, the identification code or command code needs to be set one by one and it is very complicated and inconvenient.

Therefore, a touch electronic device and a touch link method for two or more than two electronic devices are needed to execute the touch link, complete the identification such as the setting of identification codes or command codes, and simplify the operating steps for performing the data transmission function.

BRIEF SUMMARY OF THE INVENTION

Accordingly, the present invention provides a touch electronic device and a touch link method.

One embodiment of the present invention provides a touch electronic device including a touch panel, a wireless transmission module and a touch link module. The wireless transmission module is utilized to receive data request information transmitted by a first external electronic device. The data request information relates to a data transmission function. The touch link module is utilized to develop a touch link between the touch electronic device and a second external electronic device through the touch panel when the wireless transmission module receives the data request information, and receive identification information transmitted by the second external electronic device through the touch link. The wireless transmission module transmits the identification information to the first external electronic device to execute identification of the touch electronic device, and the second external electronic device is different from the first external electronic device.

Another embodiment of the present invention provides a data transmission method utilized for a touch electronic device. The data transmission method includes receiving data request information transmitted by a first external electronic device, wherein the data request information relates to a data transmission function; developing a touch link between the touch electronic device and a second external electronic device through the touch panel when the wireless transmission module receives the data request information, wherein the second external electronic device is different from the first external electronic device; receiving identification information transmitted by the second external electronic device through the touch link; and transmitting the identification information to the first external electronic device to execute identification of the touch electronic device.

By utilizing the touch electronic device and the data transmission method provided by the present invention, the data corresponding to the characteristic or feature of the first touch electronic device could be transmitted to the first touch electronic device according to its characteristics or features.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Certain terms and figures are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, the present invention is illustrated by the following embodiments. However, the devices, components, methods and steps in the following descriptions are used to explain the present invention, and are not used to limit it.

In order to illustrate the purposes, features and advantages of the invention, the embodiments and figures of the invention are shown in detail as follows. This description is made for the purpose of illustrating the general principles of the invention and should not be taken in a limiting sense. It should be understood that the embodiments may be realized in software, hardware, firmware, or any combination thereof.

Figure 5A:
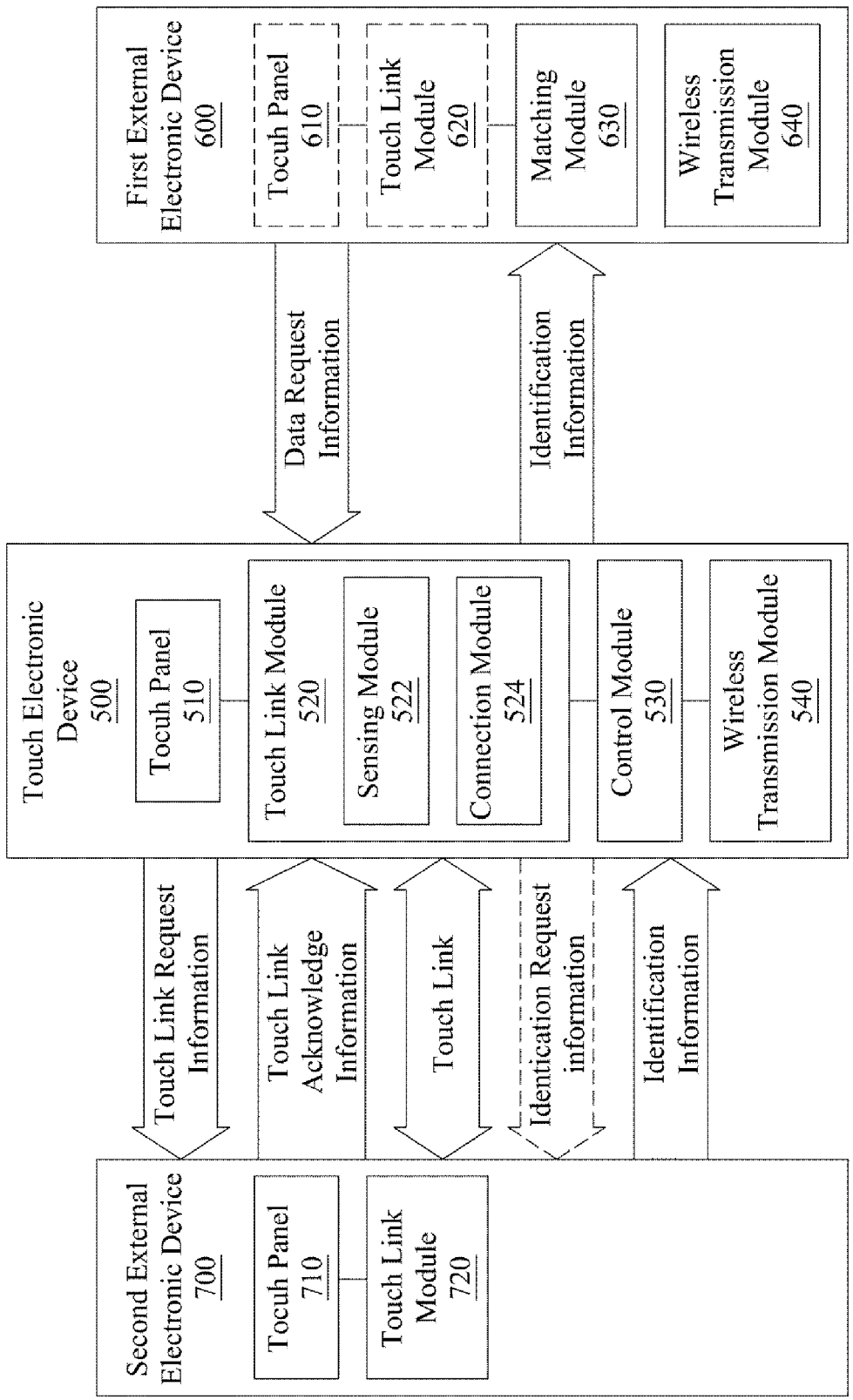
FIG. 5A is a schematic diagram illustrating a touch electronic device in accordance with the present invention.

FIG. 5A is a schematic diagram illustrating a touch electronic device 500 in accordance with the present invention. As shown in FIG. 5A, the touch electronic device 500 includes a touch panel 510, a touch link module 520, a control module 530 and a wireless transmission module 540. In one embodiment, the touch link module 520 further includes a sensing module 522 and a connection module 524. In addition, a first external electronic device 600 includes a matching module 630 and a wireless transmission module 640. A second external electronic device 700 includes a touch link module 720. For example, the touch electronic device 500, the first external electronic device 600 and/or the second external electronic device 700 could be mobile electronic devices such as cell phones, tablet computers, laptop computers, gaming apparatuses, EBooks or PDAs, or could be electronic devices such as desktop computers, servers, ticket booths, digital photo frames, point-of-sale terminals or digital maps, or could be any electronic devices equipped with touch connection modules (such as touch IC). In one embodiment, the second electronic device 700 could be a wearable electronic device such as a smart watch, a smart bracelet or a smart ring. The first external electronic device 600 could be a server for providing the function of Internet service or data transmission.

Figure 1:
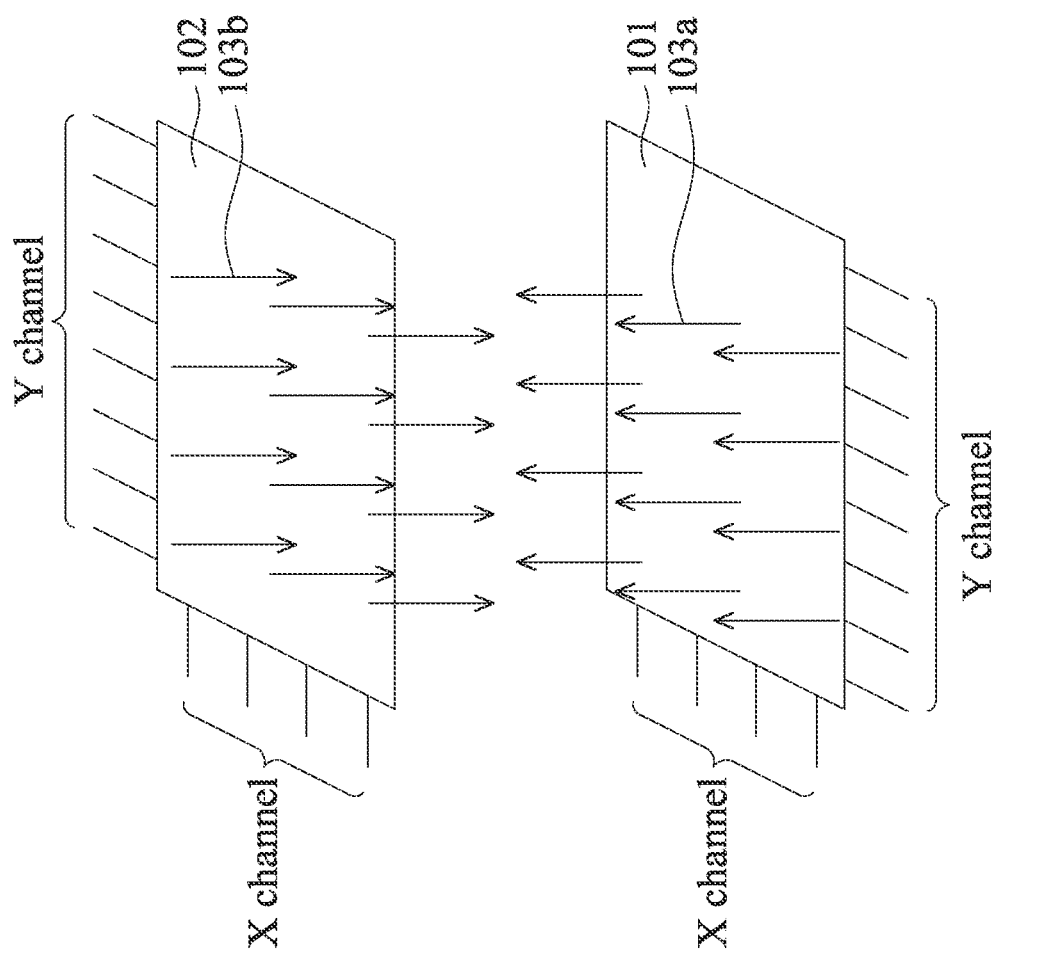
FIG. 1 is a schematic diagram of the touch connection between a first touch panel device and a second touch panel device in accordance with the prior art.
Figure 2:
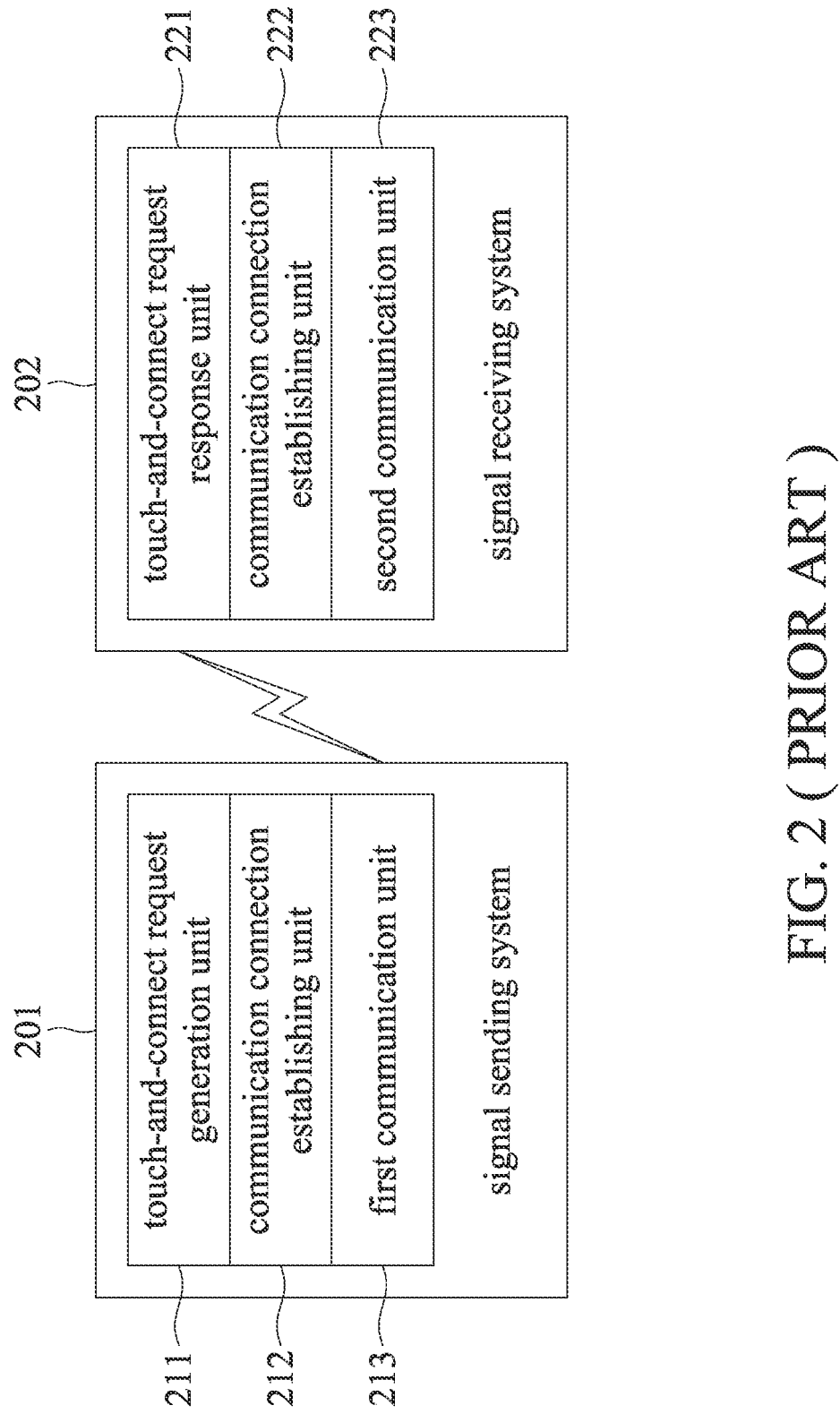
FIG. 2 is a logic chart for achieving the touch connection system between the first touch panel device and the second touch panel device in accordance with the prior art.
Figure 3:
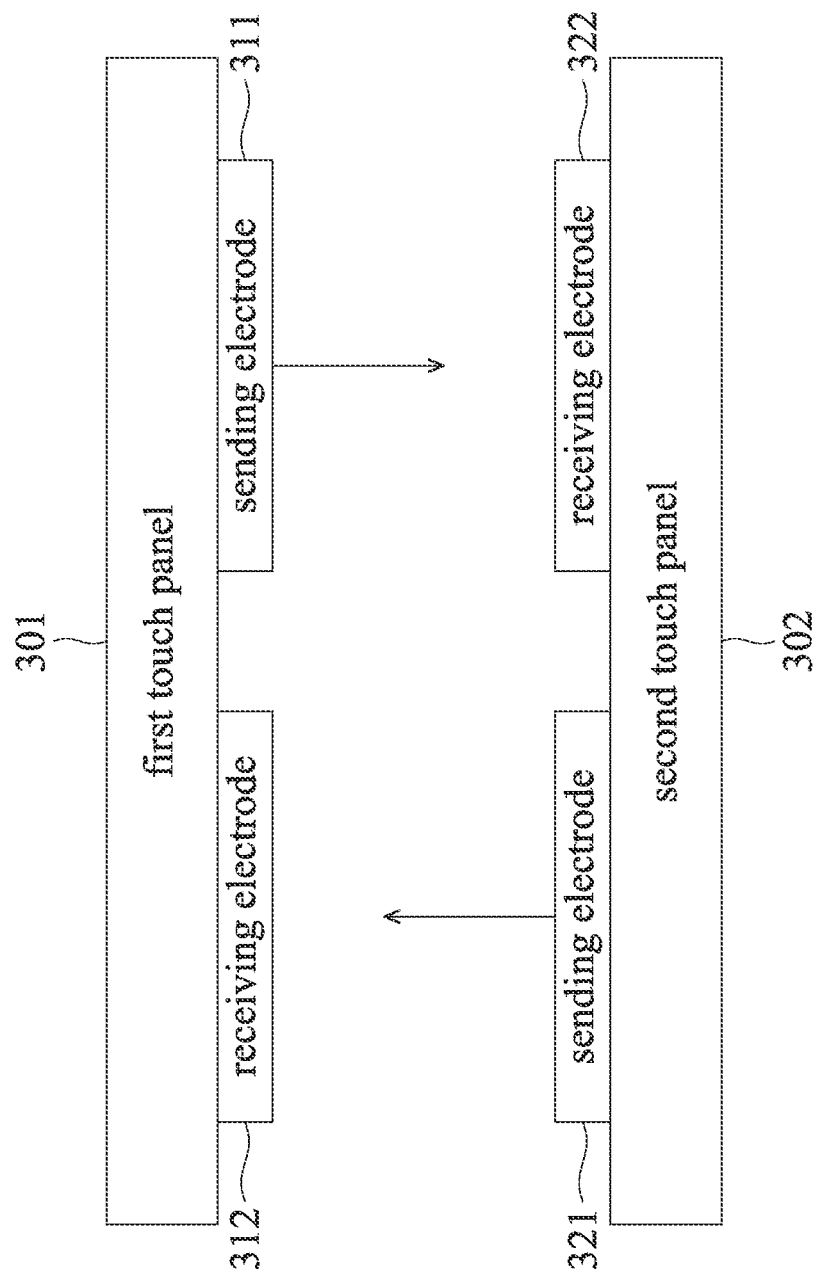
FIG. 3 is a schematic diagram illustrating the transmission and reception of the signal by the electrodes of the touch panel in the prior art.
Figure 4:
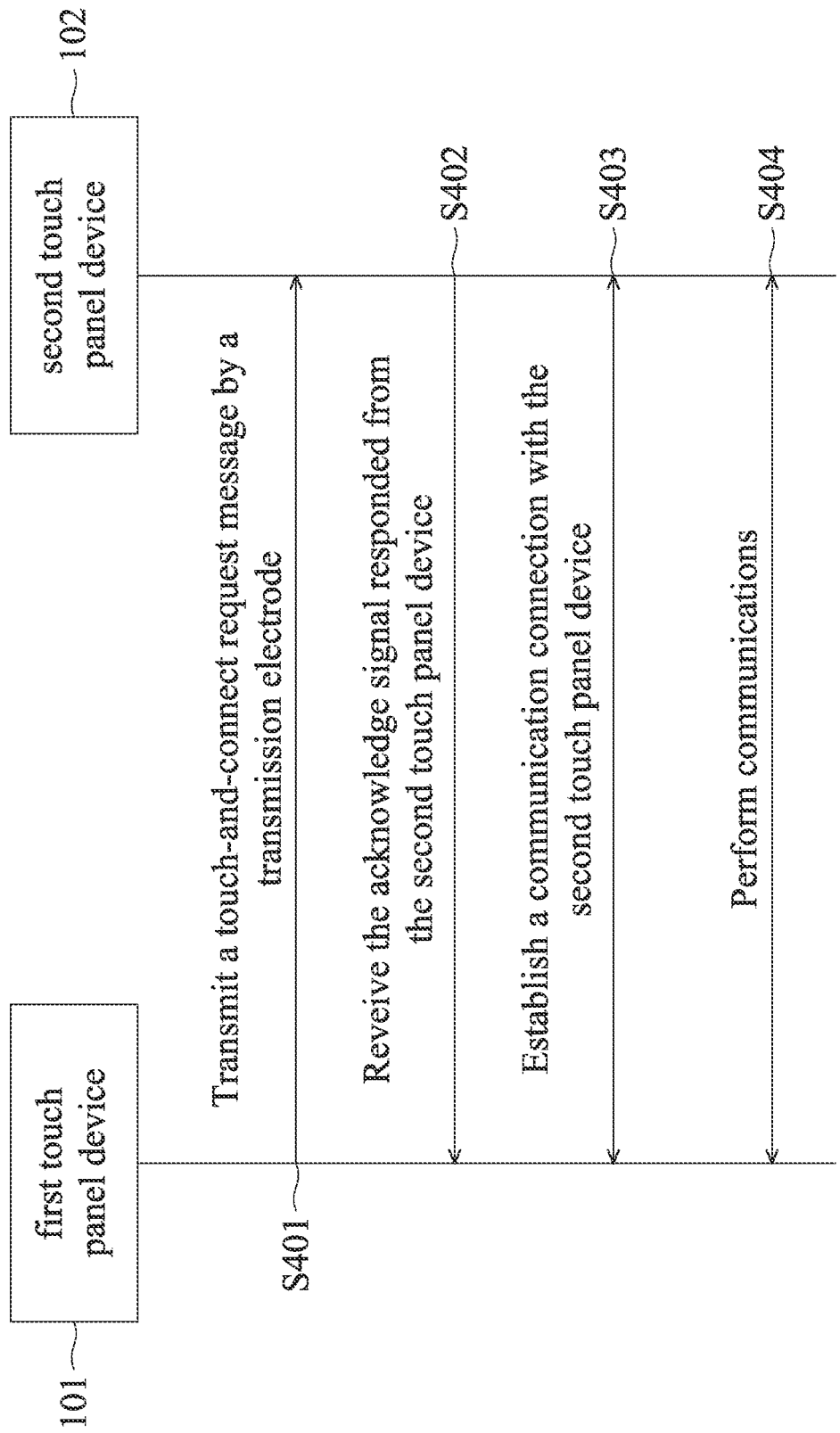
FIG. 4 is a flow chart of the touch connection method in accordance with the prior art.

The control module 530 and/or the matching module 630 could include digital signal processors (DSP), microcontrollers (MCU), central-processing units (CPU) or a plurality of parallel processors relating the parallel processing environment to implement the operating system (OS), firmware, driver and/or other applications of the electronic devices. The touch electronic device 500 and the second external electronic device 700 detect whether they are physically adjacent to a device (such as being close or touching) through the touch link modules 520 and 720 respectively. Once physical adjacency is detected, the first communication channel of the touch link is developed. For example, the sensing module 522 senses the interacting electromagnetic field (such as the method illustrated in FIG. 3, the interacting electromagnetic field is determined by the sending electrode and the receiving electrode of the touch panel) between the touch electronic device 500 and the second external electronic device 700. Whether the second external electronic device 700 is physically adjacent to the touch electronic device 500 or not is determined by changes in the electromagnetic field. When the physical adjacency is detected, the connection module 524 develops the first communication channel with the touch link module 720. In one embodiment, the connection module 524 could be the information sending system and/or the information receiving system as shown in FIG. 2, and the first communication channel with the second external electronic device 700 is developed by the first communication unit 213 shown in FIG. 2 through the touch panel 510 of the touch electronic device 500 and the touch panel 710 of the second external electronic device 700. In one embodiment, the wireless transmission module 540 of the touch electronic device 500 is utilized to receive the data request information transmitted by the first external electronic device 600. Specifically, the above data request information relates to the data transmission function such as defray, payment, log-in and/or registration which belong to the Internet service requiring identification and the Internet service requiring identification for data transmission (such as documents, pictures, data of the contacts, and video documents). After the wireless transmission module 540 receives the data request signal, the subscriber tries to develop the touch link with the second external electronic device 700 through the touch link module 520, and receives the identification information transmitted by the second external electronic device 700. Afterwards, the wireless transmission module 540 of the touch electronic device 500 transmits the identification information to the first external electronic device 600 such that the first external electronic device 600 can execute the identification for the touch electronic device 500. In addition, the second external electronic device 700 is different from the first external electronic device 600.

It should be noted that the data or information is transmitted through the touch link between the touch electronic device 500 and the second external electronic device 700. When the touch electronic device 500 is adjacent to the second external electronic device 700 to develop communication, the electromagnetic field originally related to the second external electronic device 700 could affect the sensing module 522 of the touch electronic device 500. Similarly, another electromagnetic field originally related to the touch electronic device 500 could affect the touch link module 720 of the second external electronic device 700. When the distance of the touch electronic device 500 and the second external electronic device 700 is in the scale of millimeters (mm), for example, 5 mm, they can be considered to be adjacent. The distance is determined by the features of the related touch electronic device and its sense module. For example, the distance of 0.3 mm to 0.8 mm could be considered physically adjacent. In other words, when the distance of the touch electronic device 500 and the second external electronic device 700 is smaller than or equal to a predetermined maximum distance (such as 5 mm), the touch electronic device 500 determines that it is adjacent to the second external electronic device 700. When physical adjacency between the touch electronic device 500 and the second external electronic device 700 is determined, the touch electronic device 500 transmits the touch link request information to the second external electronic device 700, and develops the touch link between the two devices through the touch link acknowledge information responded by the second external electronic device 700. Afterwards, through the methods of touch link, the subscriber can make the second external electronic device 700 adjacent to the touch electronic device 500 and performs the identification, and it is needless to frequently input the identification code or the command code. It should be noted that one second external electronic device 700 is illustrated in the embodiment of the present invention, however, in another embodiment, two or more than two second external electronic devices 700 could also be utilized to be adjacent to the touch electronic device 500 for performing the identification. The security of operations could be further improved by getting rid of the complexity of inputting the identification code or the command code.

On the other hand, the touch electronic device 500 transmits data or information with the first external electronic device 600 through the wireless transmission, such as the data request information and the identification information. In addition, the identification information could include the information such as IMEI, IMSI, MISIDN, DeviceName, Email and Contact Info. Specifically, the above identification information includes dynamic acknowledge code, the payment code, and the combination of the payment code and/or the dynamic acknowledge code. It should be noted that the above identification information is illustrated in the form of numbers, and it could also be other data for indicating the identification features such as IMEI, device name and contact information. For example, the wireless transmission is executed between the touch electronic device 500 and the first external electronic device 600 based on the protocols of wireless communication. The protocol of wireless communication could constitute GSM, GPRS, EDGE, UMTS, W-CDMA, CDMA2000, TD-CDMA, Bluetooth, NFC, WiFi, WiMAX, LTE, LTE-A or TD-LTE. In another embodiment, data or information could be transmitted between the touch electronic device 500 and the first external electronic device 600 through the touch link. For example, in another embodiment, the first external electronic device 600 includes the touch link module 620 and the touch panel 610 to develop the touch link between the touch electronic device 500 and the first external electronic device 600. The steps for developing the touch link have been illustrated before and will not be repeated.

In one embodiment, the first external electronic device 600 includes a data base (not shown) to store several identification data. When the first external electronic device 600 receives the identification information from the touch electronic device 500, the matching module 630 matches the identification information to confirm whether or not the touch electronic device 500 matches the identification of the first external electronic device 600. For example, when the identification information matches one identification data of the data base, the matching module 630 confirms the touch electronic device 500 successfully. When the identification information does not match one identification data of the data base, the matching module 630 cannot confirm the touch electronic device 500 successfully. In one embodiment, after the matching module 630 finishing the matching, the wireless transmission module 640 transmits the matching indication information to the touch electronic device 500 to inform the touch electronic device 500 whether the identification is successful or not. In addition, when the identification is successful, the first external electronic device 600 executes the functions such as the mobile payment. In other words, when the identification fails, the first external electronic device 600 will not execute the above functions to maintain the security of the Internet service.

In addition, when the sensing module 522 of the touch electronic device 500 detects the physical adjacency of the second external electronic device 700, the connection module 524 transmits the touch link request information to the second external electronic device 700. Afterwards, after the second external electronic device 700 receives the touch link request information, it transmits the touch link acknowledge information to the touch electronic device 500 to develop the touch link between the touch electronic device 500 and the second external electronic device 700. It should be noted that the control module 530 of the touch electronic device 500 determines to develop the touch link between the touch electronic device 500 and the second external electronic device 700 by determining whether or not the touch link acknowledge information is received. When the touch electronic device 500 does not receive the touch link acknowledge information, the control module 530 further determines whether the touch electronic device 500 transmits the touch link request information more than a predetermined number of times or transmits the touch link request information longer than a predetermined period. If the control module 530 determines that the touch electronic device 500 does not transmit the touch link request information more than a predetermined number of times or not transmit the touch link request information longer than a predetermined period, the touch electronic device 500 transmits the touch link request signal to the second external electronic device 700 again. If the control module 530 determines that the touch electronic device 500 transmits the touch link request information more than a predetermined number of times or transmits the touch link request information longer than a predetermined period, the touch electronic device 500 stops transmitting the touch link request signal to the second external electronic device 700. In other words, the touch electronic device 500 stops developing the touch link with the second external electronic device 700.

Figure 5B:
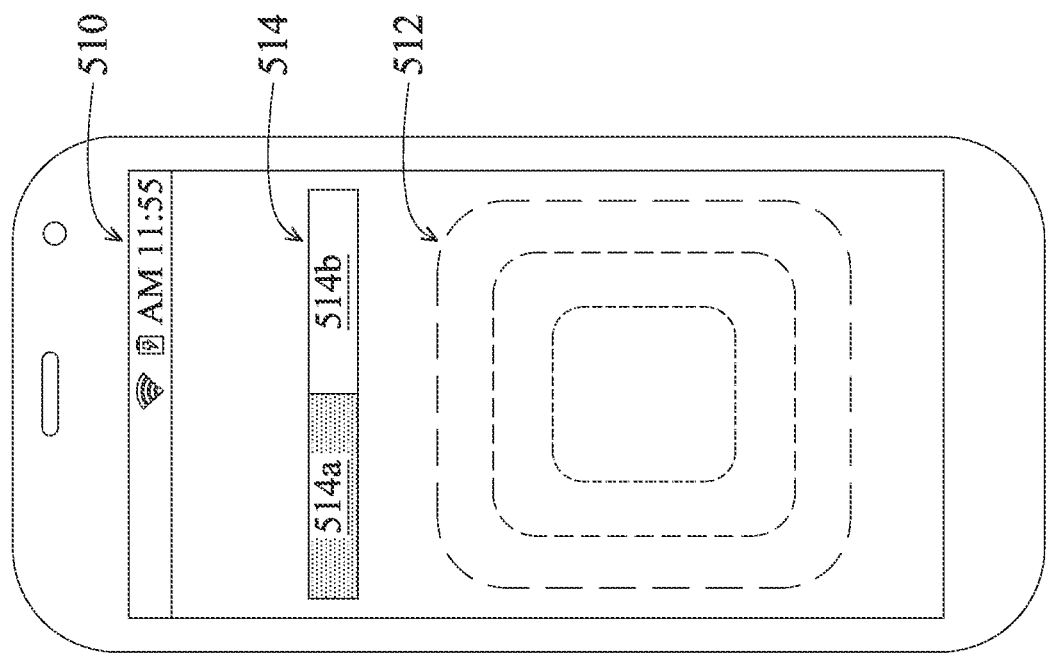
FIG. 5B is another schematic diagram illustrating a touch electronic device in accordance with the present invention.
Figure 6A:
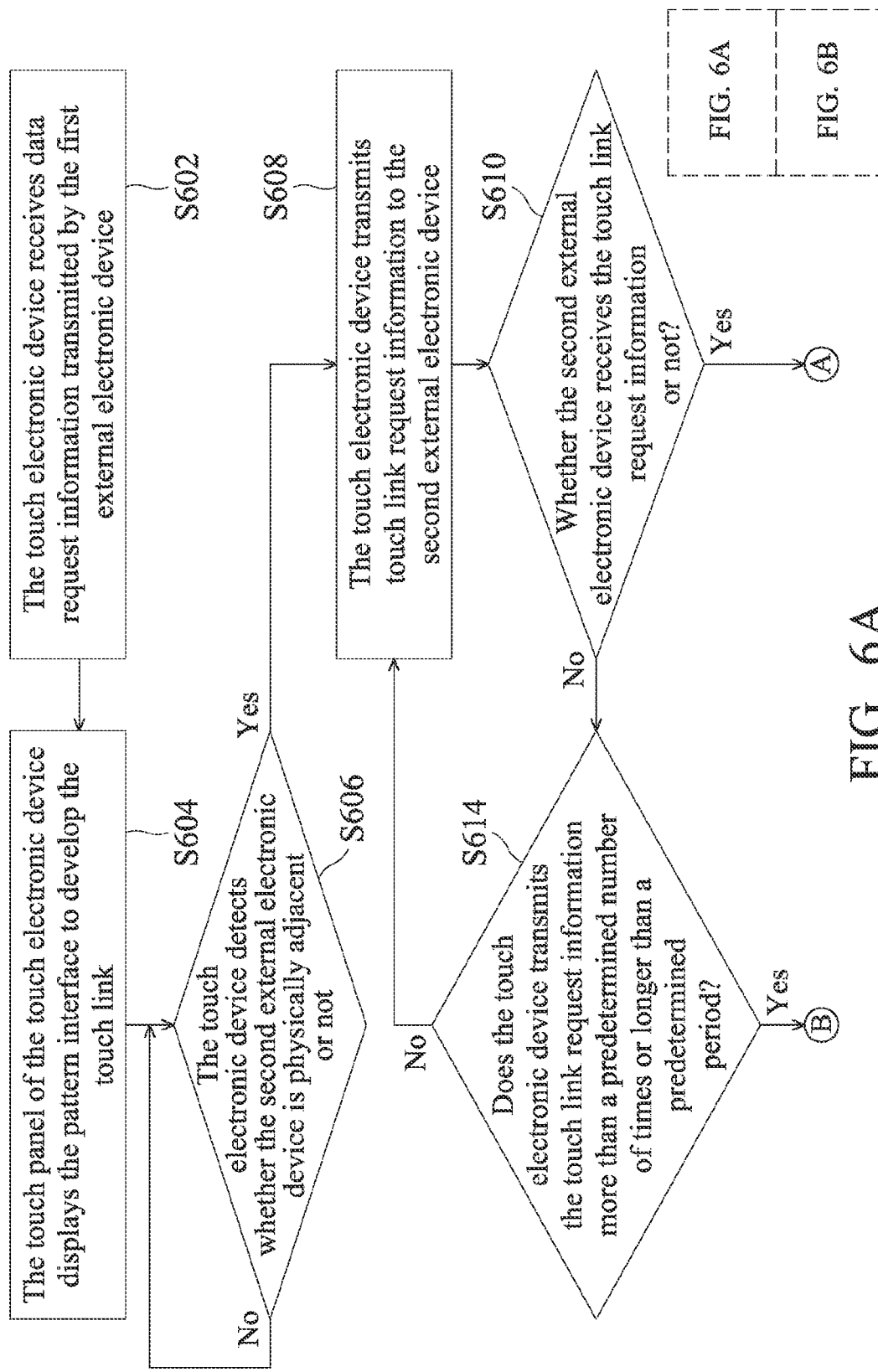
FIGS. 6A and 6B are schematic diagrams illustrating the touch link methods in accordance with the present invention.
Figure 6B:
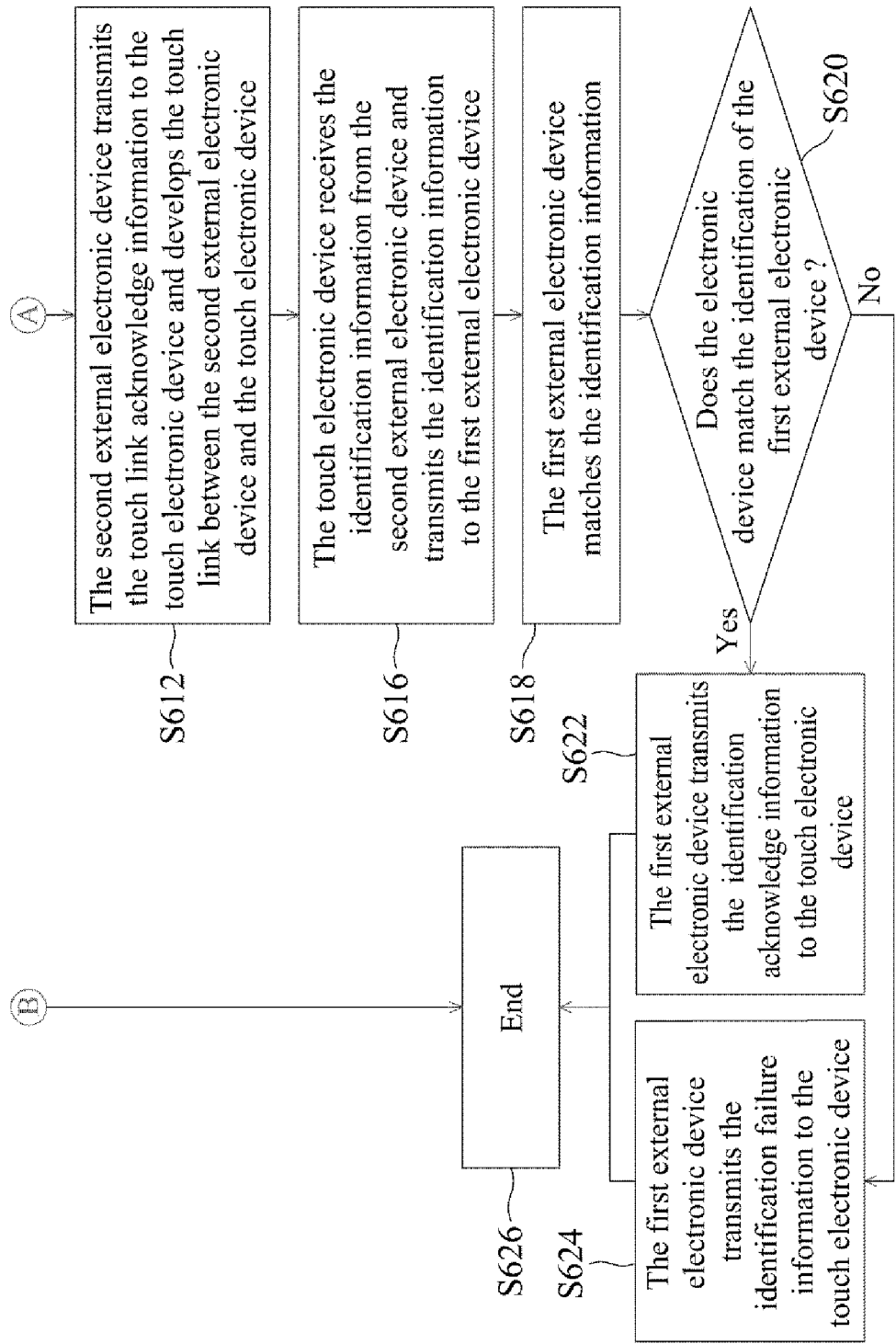

FIG. 5B is another schematic diagram illustrating a touch electronic device in accordance with the present invention. As shown in FIG. 5B, when the wireless transmission module 540 of the touch electronic device 500 receives the data request information of the first external electronic device 600, the display panel 510 displays the interface pattern 512 for developing the touch link between the touch electronic device 500 and the second external electronic device 700. In this embodiment, when the touch electronic device 500 detects that the second external electronic device 700 is physically adjacent to the interface pattern 512, the touch electronic device 500 develops the touch link between the touch electronic device 500 and the second external electronic device 700 through the touch panel 510. In another embodiment, the touch panel 510 further displays the pattern button 514 for switching the above interface pattern and the normal interface (the interface for executing functions other than the touch link). For example, the normal interface includes at least one text for the subscriber to input the identification information such as the identification code. In other words, the normal interface does not have the interface pattern for the touch link. In addition, the pattern button 514 includes two regions of the pattern button 514a and the pattern button 514b. For example, when the subscriber touches the pattern button 514a, the touch panel 510 displays the interface pattern 512. When the subscriber touches the pattern button 514b, the touch panel 510 displays the normal interface. It should be noted that the touch panel 510 can also display other interfaces for developing the touch link. The embodiments described above are used for illustration and not for limitation.

According to the embodiments described above, the data request information received by the wireless transmission module 540 of the touch electronic device 500 could be related to mobile payment, such as the payment function of Alipay. When the server of Alipay transmits data request information to the touch electronic device 500 for acknowledging a payment through the wireless Internet, the corresponding interface will be displayed on the touch panel of the touch electronic device. As illustrated above, the interface pattern or the normal interface could be displayed on the touch panel according to the selection of the subscriber. In the case of the normal interface, the subscriber needs to manually input content indicating their identification to implement the mobile payment described above. In the case of an interface pattern, the subscriber can utilize the touch electronic device for the touch link with another external electronic device to finish the identification acknowledgement and perform the mobile payment. In another embodiment, when the subscriber tries to transmit data to another electronic device through the touch electronic device, or another electronic device requests data from the touch electronic device, the identification for the operating subscriber is needed for security. Similarly, the touch electronic device could be touch linked through the third electronic device, and the identification information could be transmitted to the touch electronic device to perform the identification acknowledgement. The embodiments described above are utilized for illustration of the present invention but not for limitation.

In one embodiment, if the contacting area of the interface pattern 512 of the touch electronic device 500 with the second external electronic device 700 is larger than a predetermined area value, the touch electronic device 500 determines that the second external electronic device 700 is adjacent to or contacts the touch electronic device 500 and develops the touch link between the touch electronic device 500 and the second external electronic device 700 accordingly. For example, the above predetermined area value is 80% of the area of the interface pattern 512. If the contacting area of the interface pattern 512 of the touch electronic device 500 with the second external electronic device 700 is not larger than the predetermined area value, the touch electronic device 500 determines that the second external electronic device 700 is not adjacent to or contacts the touch electronic device 500 and will not develop the touch link between the touch electronic device 500 and the second external electronic device 700 accordingly.

6A and 6B are schematic diagrams illustrating the touch link methods in accordance with the present invention. In step S602, the touch electronic device 500 receives data request information transmitted by the first external electronic device 600 to execute the function of data transmission. For example, the transmission and receiving of the data request information are executed through the methods such as WiFi, Bluetooth or touch link by the touch electronic device 500 and the first external electronic device 600. In step S604, the touch panel 510 of the touch electronic device 500 displays the interface pattern 512 to develop the touch link. Afterwards, in step S606, the touch electronic device 500 detects whether the second external electronic device 700 is physically adjacent or not. If the touch electronic device 500 detects that the second external electronics device 700 is physically adjacent, step S608 is executed. If the touch electronic device 500 detects that the second external electronic device 700 is not physically adjacent, step S606 is executed again. In step S608, the touch electronic device 500 transmits touch link request information to the second external electronic device 700.

Afterwards, in step S610, the second external electronic device 700 determines whether it receives the touch link request information or not. If the second external electronic device 700 receives the touch link request information, the step S612 is executed. If the second external electronic device 700 does not receive the touch link request information, the step S614 is executed. In step S614, the touch electronic device 500 determines whether or not the touch link request information is transmitted more than a predetermined number of times or longer than a predetermined period. If the touch electronic device 500 determines that the touch link request information is not transmitted more than a predetermined number of times or longer than a predetermined period, step S608 is executed. If the touch electronic device 500 determines that the touch link request information is transmitted more than a predetermined number of times or longer than a predetermined period, step S626 is executed to finish the touch link method.

In addition, in step S612, the second external electronic device 700 transmits the touch link acknowledge information to the touch electronic device 500 and develops the touch link between the second external electronic device 700 and the touch electronic device 500. Afterwards step S616 is executed that the touch electronic device 500 receives the identification information from the second external electronic device 700 and transmits the identification information to the first external electronic device 600. In step S618, the first external electronic device 600 matches the identification information. In step S620, the first external electronic device 600 determines whether the touch electronic device 500 matches the identification of the first external electronic device 600. If the touch electronic device 500 matches the identification of the first external electronic device 600, step S622 is executed that the first external electronic device 600 transmits the identification acknowledge information to the touch electronic device 500, and step S626 is executed to finish the touch link method. If the touch electronic device 500 does not match the identification of the first external electronic device 600, step S624 is executed that the first external electronic device 600 transmits the identification failure information to the touch electronic device 500, and step S626 is executed to finish the touch link method.

It should be noted that people in the art could ignore, add or amend some steps of the above touch link method without departing from the spiritual basis of the present invention. For example, a step for the touch electronic device to transmit the identification request information to the second external electronic device could be added between the steps S612 and S616. Afterwards, in step S616, because the second external electronic device receives the above identification request information, it transmits the identification information to the touch electronic device, and the touch electronic device successfully receives it. The identification request information relates to the data request information transmitted from the first external electronic device to the touch electronic device. In addition, if two or more than two second external electronic devices are required for the identification, after the touch electronic device develops the touch link with the two or more than two second external electronic devices, the touch electronic device receives the identification information from the two or more than two second external electronic devices simultaneously or sequentially, and transmits the identification information to the first external electronic device in step S616.

Accordingly, the present invention provides a touch electronic device and a touch link method for two or more than two electronic devices to develop touch link, perform identification such as the setting of identification codes or command codes, and have the convenience with the touch operation. By utilizing the touch electronic device and touch link method of the present invention, when the users want to execute the data transmission function between electronic devices, the complicated steps for setting the payment code or the identification code one by one are not needed. The identification functions such as the mobile payment could be easily performed through the touch link and the interface pattern.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. In addition, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A touch electronic device, comprising:
   a wireless transmission module, utilized to receive a data request information transmitted by a first external electronic device, and to transmit an identification information to the first external electronic device to execute identification of the touch electronic device, wherein the data request information relates to a data transmission function;

a touch panel, utilized to display a pattern button for switching between an interface pattern and a normal interface, wherein the identification information is input by a subscriber when the pattern button is touched for choosing the normal interface; and a touch link module, utilized to develop a touch link between the touch electronic device and a second external electronic device through the touch panel after the wireless transmission module receives the data request information and after the pattern button is touched for choosing the interface pattern, and to receive the identification information transmitted by the second external electronic device through the touch link, wherein the second external electronic device is different from the first external electronic device.

2. The touch electronic device as claimed in claim 1, wherein the first external electronic device matches the identification information to confirm whether or not the touch electronic device matches the identification of the first external electronic device, and the first external electronic device transmits an identification acknowledge information to the touch electronic device when it is matched.

3. The touch electronic device as claimed in claim 1, wherein when the wireless transmission module receives the data request information, the touch panel displays the interface pattern for developing the touch link.

4. The touch electronic device as claimed in claim 3, wherein when the second external electronic device is physically adjacent to the interface pattern, the touch electronic device develops the touch link between the touch electronic device and the second external electronic device through the touch panel.

5. The touch electronic device as claimed in claim 1, wherein the touch link module further comprises:
a sensing module, utilized to detect a physical adjacency between the touch electronic device and the second external electronic device; and
a connection module, utilized to develop the touch link between the touch electronic device and the second external electronic device through the touch panel when the sensing module detects the physical adjacency.

6. The touch electronic device as claimed in claim 5, wherein the connection module transmits a touch link request information to the second external electronic device to develop the touch link between the touch electronic device and the second external electronic device.

7. The touch electronic device as claimed in claim 6, further comprising a control module to determine whether or not the touch electronic device transmits the touch link request information more than a predetermined number of times or longer than a predetermined period, wherein when the touch electronic device does not transmit the touch link request information more than a predetermined number of times nor transmit the touch link request information longer than a predetermined period, the connection module re-transmits the touch link request information to the second external electronic device, otherwise, the connection module stops transmitting the touch link request information to the second external electronic device.

8. The touch electronic device as claimed in claim 6, wherein when the touch electronic device receives a touch link acknowledge information transmitted by the second external electronic device, the touch electronic device confirms developing the touch link between the touch electronic device and the second external electronic device.

9. The touch electronic device as claimed in claim 1, wherein before the touch electronic device receives the identification information transmitted by the second external electronic device, the touch electronic device transmits an identification request information to the second external electronic device through the touch link.

10. The touch electronic device as claimed in claim 9, wherein the identification request information relates to the data request information.

11. A touch link method, utilized for a touch electronic device, comprising:
receiving a data request information transmitted by a first external electronic device, wherein the data request information relates to a data transmission function;
displaying a pattern button for switching between an interface pattern and a normal interface;
developing a touch link between the touch electronic device and a second external electronic device through a touch panel of the touch electronic device after receiving the data request information and after the pattern button being touched for choosing the interface pattern, wherein the second external electronic device is different from the first external electronic device;
receiving the identification information input by a subscriber when the pattern button is touched for choosing the normal interface or the identification information transmitted by the second external electronic device through the touch link when the pattern button is touched for choosing the interface pattern; and
transmitting the identification information to the first external electronic device to execute identification of the touch electronic device.

12. The touch link method as claimed in claim 11, further comprising matching the identification information by the first external electronic device to confirm whether or not the touch electronic device matches the identification of the first external electronic device, and transmitting an identification acknowledge information to the touch electronic device by the first external electronic device when it is matched.

13. The touch link method as claimed in claim 12, further comprising displaying the interface pattern for developing the touch link by the touch panel when the data request information is received.

14. The touch link method as claimed in claim 13, further comprising developing the touch link between the touch electronic device and the second external electronic device through the touch panel when the second external electronic device is physically adjacent to the interface pattern.

15. The touch link method as claimed in claim 11, wherein the step of developing the touch link further comprises:
detecting a physical adjacency between the touch electronic device and the second external electronic device; and
developing the touch link between the touch electronic device and the second external electronic device through the touch panel when the physical adjacency is detected.

16. The touch link method as claimed in claim 15, wherein the step of developing the touch link further comprises transmitting a touch link request information to the second external electronic device to develop the touch link between the touch electronic device and the second external electronic device.

17. The touch link method as claimed in claim 16, wherein the step of developing the touch link further comprises determining whether or not the touch electronic device transmits the touch link request information more than a predetermined number of times or longer than a predetermined period, wherein when the touch electronic device does not transmit the touch link request information more than a predetermined number of times nor transmit the touch link request information longer than a predetermined period, re-transmitting the touch link request information to the second external electronic device, otherwise, stopping transmitting the touch link request information to the second external electronic device.

18. The touch link method as claimed in claim 16, further comprising when the touch electronic device receives a touch link acknowledge information transmitted by the second external electronic device, confirming developing the touch link between the touch electronic device and the second external electronic device.

19. The touch link method as claimed in claim 11, further comprising before the touch electronic device receives the identification information transmitted by the second external electronic device, transmitting an identification request information to the second external electronic device through the touch link by the touch electronic device.

20. The touch link method as claimed in claim 19, wherein the identification request information relates to the data request information.

* * * * *